(12) United States Patent
Troy et al.

(10) Patent No.: US 8,447,805 B2
(45) Date of Patent: May 21, 2013

(54) DISTRIBUTED OPERATION OF A LOCAL POSITIONING SYSTEM

(75) Inventors: James J. Troy, Issaquah, WA (US); Scott W. Lea, Renton, WA (US)

(73) Assignee: The Boeing Company, Chicago, IL (US)

( * ) Notice: Subject to any disclaimer, the term of this patent is extended or adjusted under 35 U.S.C. 154(b) by 276 days.

(21) Appl. No.: 13/036,619

(22) Filed: Feb. 28, 2011

(65) Prior Publication Data
US 2012/0221625 A1   Aug. 30, 2012

(51) Int. Cl.
*G06F 15/16* (2006.01)
*G06F 17/00* (2006.01)

(52) U.S. Cl.
USPC ........... 709/203; 709/231; 709/206; 709/207; 705/3; 455/414.1; 455/412.1; 455/412.2; 455/512; 455/457

(58) Field of Classification Search
USPC .................................. 709/203, 231, 206, 207
See application file for complete search history.

(56) References Cited

U.S. PATENT DOCUMENTS

| | | | |
|---|---|---|---|
| 6,618,133 B2 | 9/2003 | Hedges et al. | |
| 6,630,993 B1 | 10/2003 | Hedges et al. | |
| 7,194,326 B2 | 3/2007 | Cobb et al. | |
| 7,305,277 B2 | 12/2007 | Freeman et al. | |
| 7,519,472 B1* | 4/2009 | Grigsby et al. | 701/468 |
| 7,859,655 B2 | 12/2010 | Troy et al. | |
| 8,311,521 B1* | 11/2012 | Paczkowski et al. | 455/414.1 |
| 2005/0228708 A1* | 10/2005 | Catala et al. | 705/9 |
| 2006/0235684 A1* | 10/2006 | Chang | 704/233 |
| 2007/0113255 A1 | 5/2007 | Kurosawa | |
| 2008/0183828 A1* | 7/2008 | Sehgal et al. | 709/206 |
| 2009/0086014 A1 | 4/2009 | Lea et al. | |
| 2010/0085437 A1 | 4/2010 | Troy et al. | |
| 2010/0102980 A1 | 4/2010 | Troy et al. | |

FOREIGN PATENT DOCUMENTS

WO PCT/US2008/077178   2/2010
WO PCT/US2009/057911   3/2010

OTHER PUBLICATIONS

Web page featuring Leica Geosystems—Leica Absolute Tracker (TM) All-New Groundbreaking Laser Tracker Systems, www.leica-geosystems.com (date of first publication unknown).
Web page featuring Leica Geosystems—Leica TPS1200+ The Total Station with the Plus, www.leica-geosystems.com (date of first publication unknown).
Web page featuring Leica Geosystems—Leica DISTO™ A8 The visionary one—for in and outdoors, www.leica-geosystems.com (date of first publication unknown).

(Continued)

*Primary Examiner* — Jude Jean Gilles
(74) *Attorney, Agent, or Firm* — Darren J. Gold

(57) ABSTRACT

Presented is a system and method for distributed operation of Local Positioning Systems (LPS). A method includes establishing a network connection with a local controller and providing a user interface for sending device commands to an LPS associated with the local controller, and may include requesting a network address of a server for streaming video. The user interface can control a plurality of LPS units and the local controller can accept device commands from a plurality of user interfaces. A system includes a local system with interfaces to an LPS and a network that directs device control messages to the LPS from one or more remote systems, and a remote system that establishes network connections with one or more local systems and provides a user interface for sending device control messages to the one or more LPS units.

20 Claims, 5 Drawing Sheets

OTHER PUBLICATIONS

Web page featuring Leica Geosystems—Leica RedLine—The World's most versatile Construction Site positioning range, www.leica-geosystems.com (date of first publication unknown).
Web page featuring Leica Geosystems—Leica Builder T100/T200; R100/R200; R100M/R200M, www.leica-geosystems.com (date of first publication unknown).
Web page featuring Leica Geosystems—Leica Dimensional Control Program—Application Software DCP, www.leica-geosystems.com (date of first publication unknown).
Web page featuring ViconBlade, Vicon Motion Systems, www.vicon.com (date of first publication unknown).
Web page featuring MotionAnalysis—The Industry Leader for 3D Passive Optical Motion Capture—Raptor-4 Digital RealTime System, www.MotionAnalysis.com (date of first publication unknown).
Web page featuring ProCollector and ProCommander—a dynamic duo of laser power, www.SL-LASER.com (date of first publication unknown).
Web page featuring ProDirector XS—When Size Matters, www.laserprojection.com/na/m_ProDirector4.htm (date of first publication unknown).
Web page featuring Laser Projections Technologies, Inc. LPT1; LPT 10; LPT 100 Laser Radar Project, www.lptcorp.com (date of first publication unknown).
Web page featuring HandSCAPE—MIT Tangible Media Group Projects, http://tangible.media.mit.edu/projects/handscape/ (date of first publication unknown).
Craig, J.J., Introduction to Robotics Mechanics & Control, Addison-Wesley Publishing Company, 1986, pp. 139-146.
International Search Report, PCT/US2008/077178, Nov. 5, 2009.
Web page http://en.wikipedia.org/wiki/Distributed_computing (date of first publication unknown).
Web page http://en.wikipedia.org/wiki/Internet_socket (date of first publication unknown).
Web page featuring The CMUcam1 Vision Sensor, http://www.cs.cmu.edu/~cmucam/home.html (date of first publication unknown).
Web page featuring The CMUcam2, http://www.cs.cmu.edu/~cmucam2/ (date of first publication unknown).
Web page featuring The CMUcam3: Open Source Programmable Embedded Color Vision Platform, http://www.cmucam.org/ (date of first publication unknown).
Web page featuring ARToolKit, http://www.hitl.washington.edu/artoolkit/ (date of first publication unknown).
Web page describing Webex, http://en.wikipedia.org/wik/WebEx (date of first publication unknown).
Web page featuring Webex, http://www.webex.com/overview/ (date of first publication unknown).
Web page featuring GoToMeeting, http://www.gotomeeting.com/fec/ (date of first publication unknown).
Web page describing Microsoft Netmeeting, http://en.wikipedia.org/wiki/Microsoft_NetMeeting (date of first publication unknown).
Web page describing Citrix, en.wikipedia.org/wiki/Citrix_Systems (date of first publication unknown).
Web page describing Microsoft Remote Desktop, en.wikipedia.org/wiki/Remote_Desktop_Connection (date of first publication unknown).
Web page describing Secure Shell, en.wikipedia.org/wiki/Secure_Shell (date of first publication unknown).
Web page describing telnet, http://en.wikipedia.org/wiki/Telnet (date of first publication unknown).
Web page describing cloud computing, http://en.wikipedia.org/wiki/Cloud_computing (date of first publication unknown).
PCT, International Search Report and Written Opinion, International Application No. PCT/US2012/022501 (May 22, 2012).

* cited by examiner

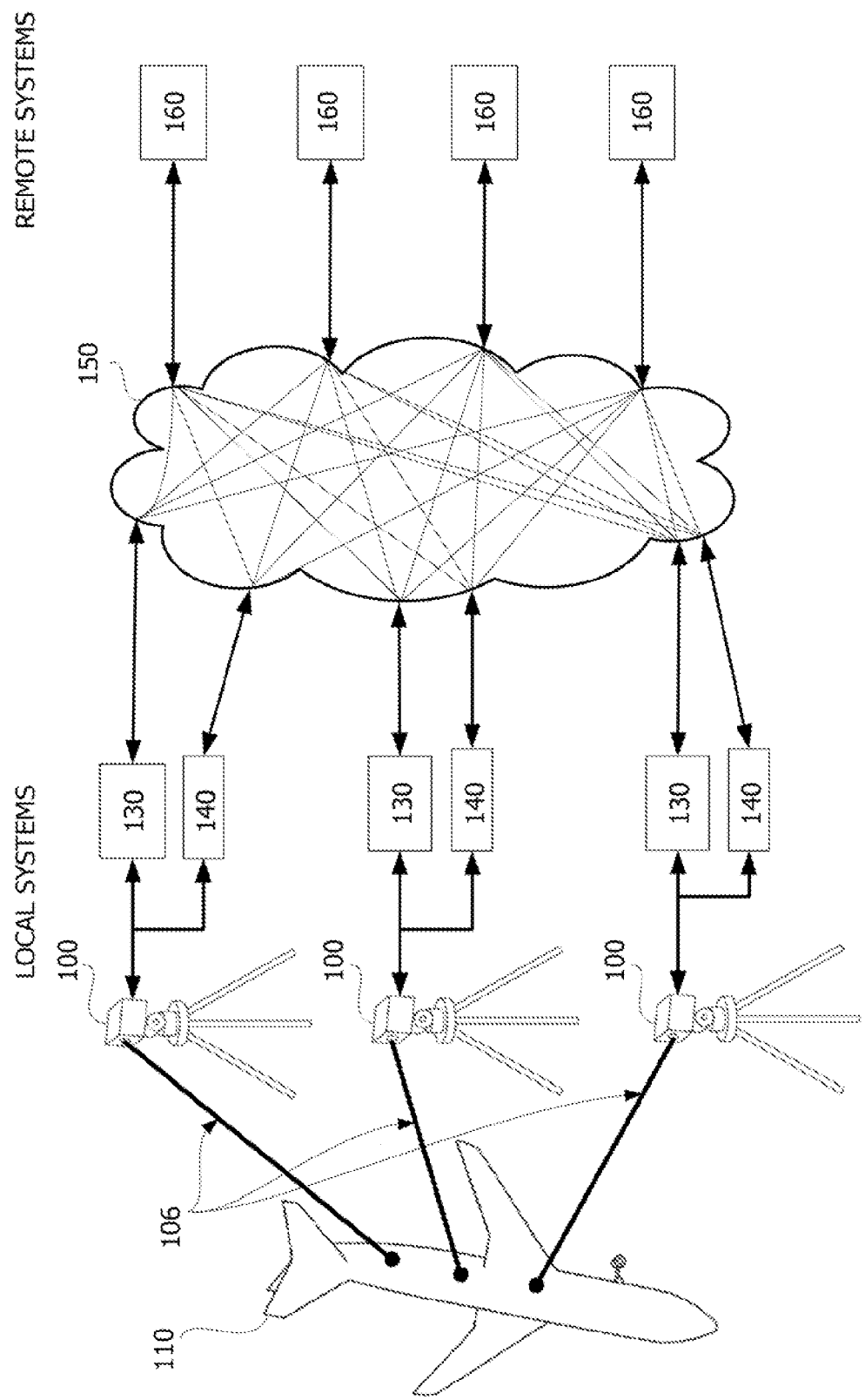

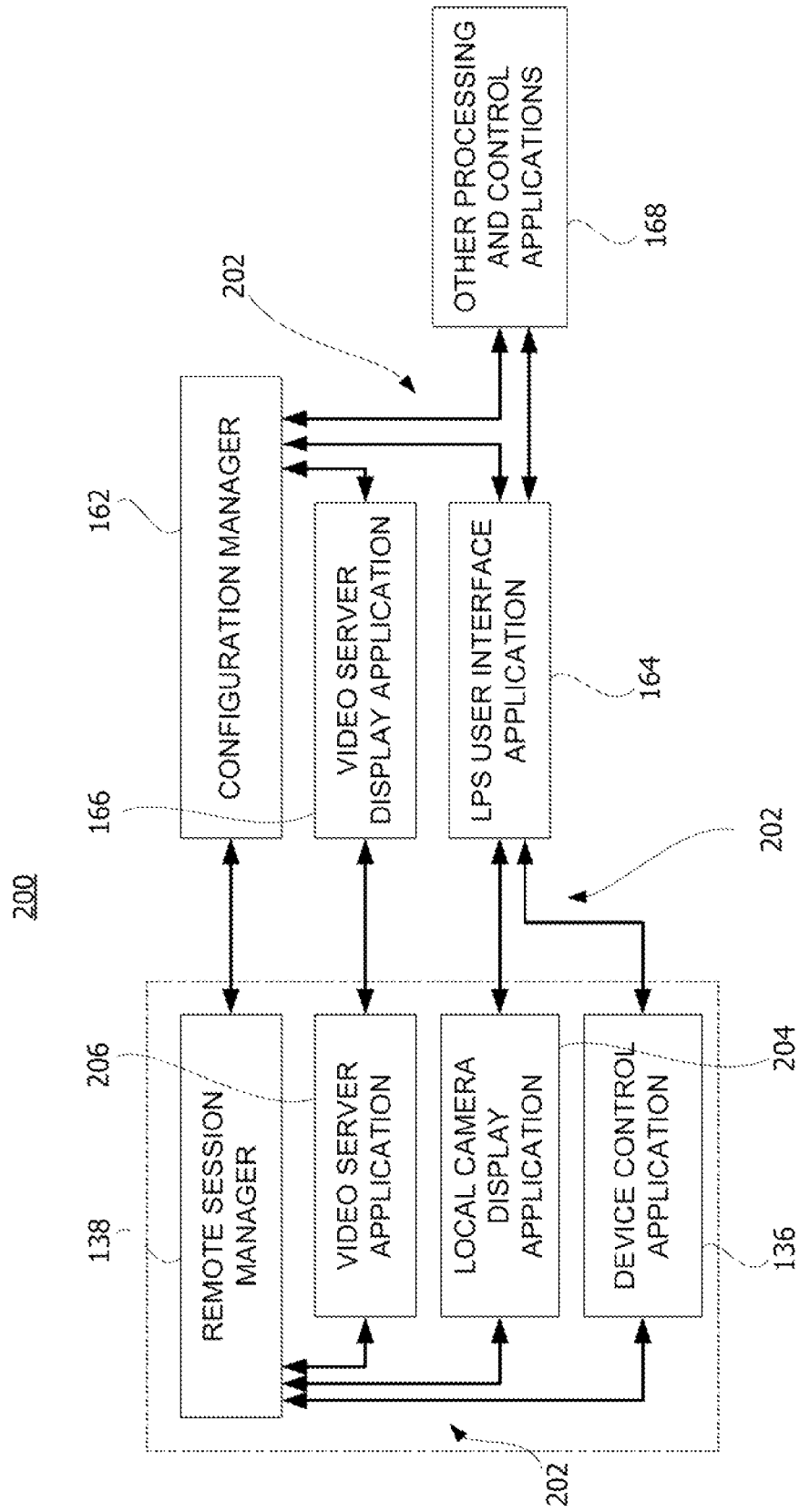

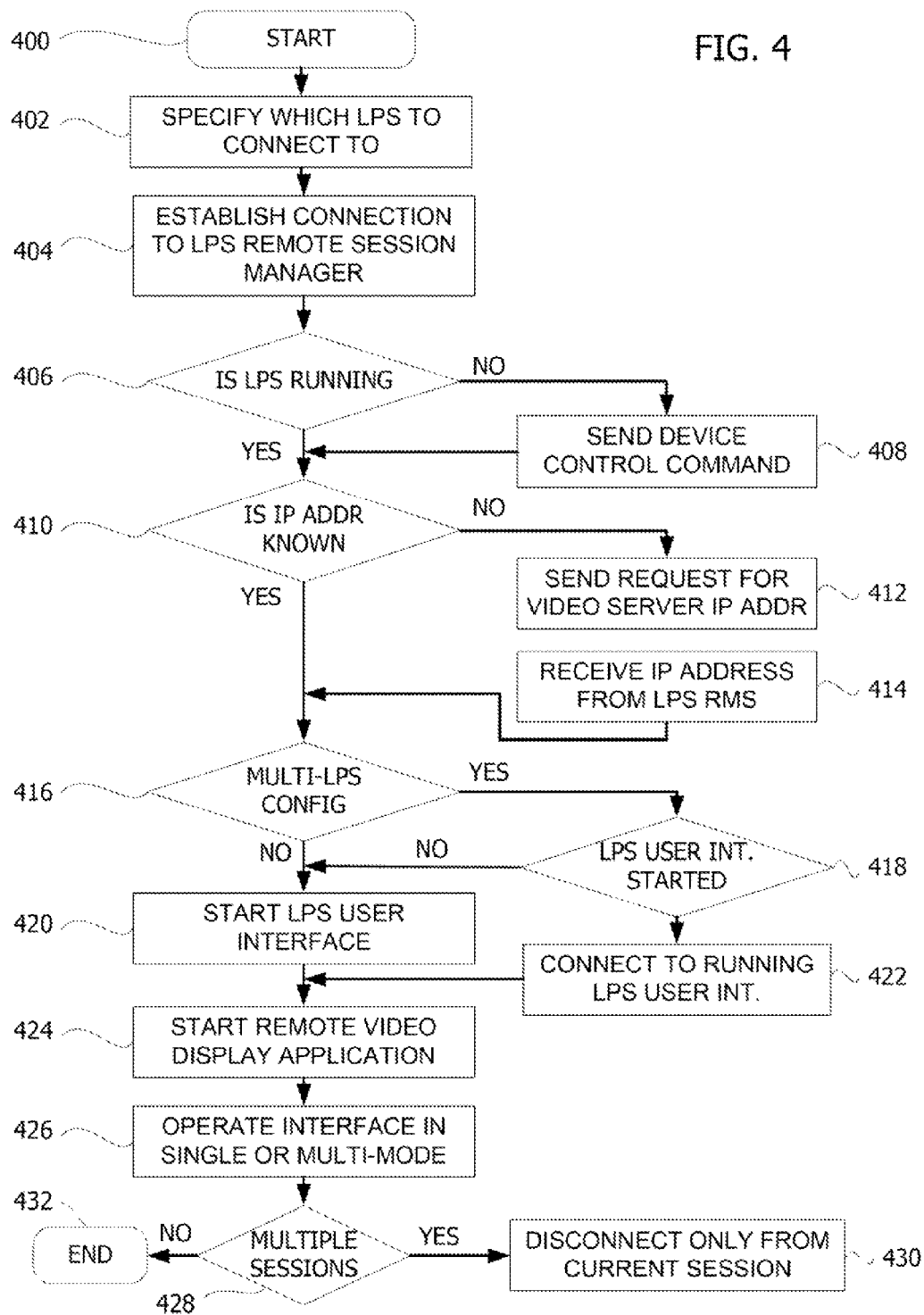

DISTRIBUTED OPERATION OF A LOCAL POSITIONING SYSTEM

CROSS REFERENCE TO RELATED APPLICATIONS

The present application is related to U.S. patent application Ser. No. 12/561,544 filed May 20, 2010, and U.S. patent application Ser. No. 11/863,755 filed Sep. 28, 2007, and PCT Application No. PCT/US09/57911 filed Sep. 22, 2009, and U.S. Pat. No. 7,859,655 issued Dec. 28, 2010, the entire disclosures of which are incorporated by reference.

FIELD

Embodiments of the subject matter described herein relate generally to a system and method for remote operation of Local Positioning Systems.

BACKGROUND

A Local Positioning System (LPS) permits an operator to acquire local coordinate measurement and imaging data for an object in the view of the physical hardware of the LPS. For example, an inspector viewing a particular structure on an aircraft may need to know a position on the structure that is defined in the local coordinate system of the aircraft in order to obtain schematics, or other information regarding that structure, that are stored and referenced using the local coordinate system of the aircraft itself.

A Local Positioning System (LPS) may use a pan-tilt unit (PTU) to orient a camera in the direction of an object for which local coordinates are needed. A laser range meter can be used to measure range to the object, or distances can be entered or derived algorithmically. Image data, measured range data, and pan-tilt angles are used along with known calibration points to determine the location of the LPS device relative to the target object. With the relative location known, LPS measurements are converted into the local coordinates of the target object's coordinate system (such as airplane or building coordinates).

An operator may control the PTU, laser range meter, camera devices and other software operations of an LPS using keyboard controls, or interface devices such as joysticks, gamepad controllers, mouse devices, etc. The LPS includes a computer system physically attached to, and collocated with, other components of the LPS. A local operator is generally in close physical proximity to the LPS, for example in the same room as the LPS. This can present difficulties if the operator needs to move around the inspection site to positions that may be out of range of direct contact with the LPS. If an operator, such as an expert inspector, is not physically at the local site, the operator may be require to travel onsite to operate the LPS.

If the LPS computer system supports remote operation, then an operator may be able to use the system from a different physical location. For example Windows Remote Desktop and Citrix on Windows systems, and remote login features of Unix/Linux based systems, can allow remote operators to remotely log into the computer system and operate some aspects of the LPS. However, although these remote login capabilities allow remote users to access the LPS, they generally limit operation of the hardware attached to the computer system and the associated control programs to a single operator at a time. They would not enable simultaneous use of the same LPS by two different users who, for example, might be collaborating on a task. This would create an undesirable scheduling issue wherein if a local user desired to use the LPS, then the remote user would need to exit the LPS control application, and vice versa.

Using remote login capabilities also creates administrative work, as granting remote users access to the LPS computer system requires setup of accounts and administration of passwords. Additionally, using these remote login features require operators to interact with the computer system at the desktop level to gain access to the attached LPS, adding operational complexity for the remote operator. Further, in terms of network bandwidth, replicating desktops on remote computers requires significant network resources, introduces additional latency, and does not always present the best quality of image and video to the remote user.

The use of remote login capability also does not address the issue of a single user connecting to multiple LPS units simultaneously as may occur if two or more LPS units are required to provide full coverage of large object, or an object having occluded regions. If a single operator desired to simultaneously operate two or more LPS units using remote login capabilities, it would be difficult, if not altogether impractical to run multiple remote sessions and control multiple LPS units concurrently, since inputs from the keyboard, mouse, gamepad, or other interface devices are assigned to only one active application at a time, even if the different screens could be presented simultaneously.

Therefore, there is a need to allow use of an LPS by multiple users simultaneously, or simultaneous use of multiple LPS by a single user, or by users not co-located with the physical hardware, while efficiently utilizing network resources.

SUMMARY

Presented is a system and method for distributed operation of a Local Positioning System (LPS) by remote and local operators. The system and method permits simultaneous use of one or more LPS units by both remote and local operators.

In an embodiment, the method for distributed operation of an LPS includes establishing a network connection with a remote session manager associated with the LPS, sending a device control command to control the LPS, and providing a user interface for sending device control commands to the LPS. The method can also include sending a network address request to the remote session manager to obtain a network address of a server that provides images from the LPS, establishing a second network connection to the server to receive the images, and displaying the images from the LPS.

In an embodiment, another method for distributed operation of an LPS includes initializing a network interface of a remote session manager associated with the LPS, listening to the network interface for network connection requests from an operator, accepting the network connections request and establishing a network connection between the remote session manager and the operator, receiving device control commands for controlling the LPS from the operator and sending the device control command to a device control application that interfaces with the LPS. The method can also include obtaining a network address of a server that provides images or video from the local positioning device, receiving a request from the operator for the network address, sending the network address to the operator, accepting a second network connection from the operator at the server, and providing the images from the server to the operator.

In an embodiment, the system for distributed operation of an LPS includes a local system and a remote system. The local system includes an interface to the LPS, a connection to the network, a number of device control applications, such as camera, tilt-pan unit, or laser range finder control applications, and a remote session manager that accepts network connections and directs device control messages to the appropriate device control application in addition to responding to remote commands The remote system includes a network interface for connecting to the network, a configuration manager that establishes a network connection with the remote session manager, and a user interface for sending device control commands to the local system. The system may also include a video server that streams video of the local positioning system; the remote session manager obtains the network address of the video server and forwards the network address to the configuration manager, a remote video display established a connection to the video server using the network address and displays the streaming video of the LPS.

The features, functions, and advantages discussed can be achieved independently in various embodiments of the present disclosure or may be combined in yet other embodiments further details of which can be seen with reference to the following description and drawings.

BRIEF DESCRIPTION OF THE DRAWINGS

The accompanying figures depict various embodiments of the system and method for providing distributed operation of a Local Positioning Systems (LPS). A brief description of each figure is provided below. Elements with the same reference number in each figure indicated identical or functionally similar elements. Additionally, the left-most digit(s) of a reference number indicate the drawing in which the reference number first appears.

FIG. 1b is a diagram of a plurality of Local Positioning Systems being controllable by a one or more Remote Systems in one embodiment of a distributed Local Positioning System;

FIG. 2 is a diagram of components of a distributed Local Positioning System in one embodiment of a distributed Local Positioning System;

FIG. 4 is a flowchart of the operation of a remote system in one embodiment of a distributed Local Positioning System.

DETAILED DESCRIPTION

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

Figure 1A:
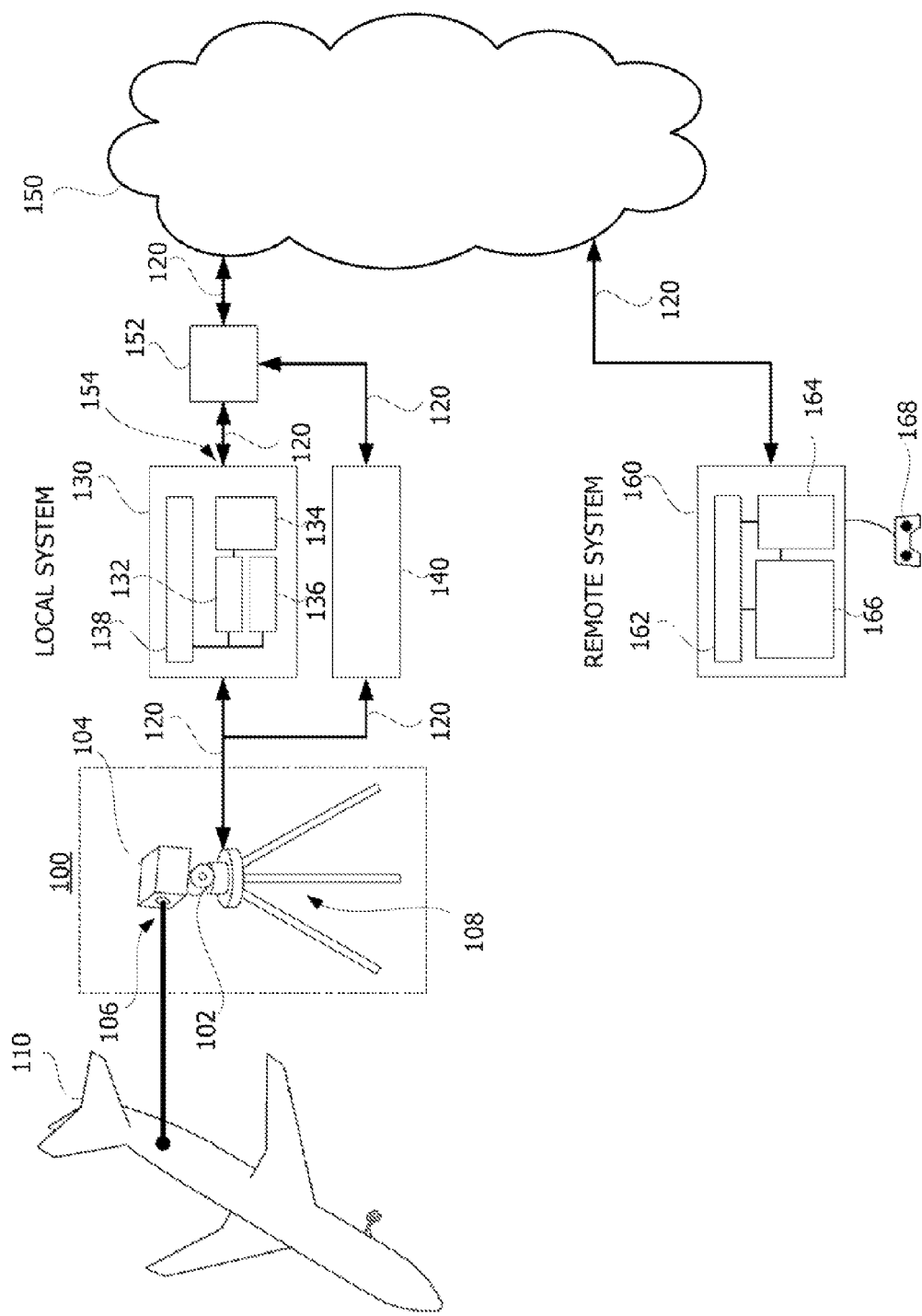
FIG. 1a is a diagram of a Local Positioning System having remote control capability in one embodiment of a distributed Local Positioning System.

Referring now to FIG. 1a, a Local Positioning System (LPS 100) uses a pan-tilt unit (PTU 102) to orient a camera 104 in the direction of a target object 110 for which local coordinates are needed. The LPS comprises a base 108 such as a tripod or other mount for positioning the LPS 100 and may be permanently affixed. A laser range meter 106 can be used to measure range from the LPS 100 to the target object 110, or distances can be entered or derived algorithmically. Image data, measured range data, and pan-tilt angles are used along with known calibration points to determine the location of the LPS 100 relative to the target object 110. With the relative location known, LPS 100 measurements are converted into the local coordinates of the coordinate system of the target object 110 (such as airplane or building coordinates).

The LPS 100 is in communication with a local controller 130, using for example interfaces such as one or more cables 120 or wireless communications. In embodiments, the cables 120 are one or more of the following: USB cables, serial cables, power cables, Ethernet cables such as CAT5 network cables, fiber optic cables, etc. The LPS 100 receives commands from the local controller 130 to control the camera 104, the laser range meter 106, and the PTU 102. The LPS sends information to the local controller 130 such as video, images, or data from the camera 104, range information from the laser range meter 106, and position information from the PTU 102.

In embodiments, the local controller 130 is a personal computer or PC, or other computing platform as would be understood in the art, having for example one or more processors, memory, and storage means such as hard drives. In embodiments, the local controller comprises interfaces 154 for communicating with other devices. Example interfaces 154 include, but are not limited to, USB and serial ports for communications with video cameras 104, PTUs 102 and laser range meters 106, and keyboards, gamepads, and other peripherals (not shown); VGA, DVI, or HDMI ports for connecting to displays (not shown); wireless, or Ethernet ports for connecting to cameras 104, PTUs 102, laser range meters 106, and networks 150.

In embodiments, the local controller 130 comprises a video conversion application 132, a local camera display window 134; a device control application 136, and a remote session manager application 138. The video conversion application 132 receives images or video from the camera 104 of the LPS 100 and, if necessary, converts the images or video to a format appropriate for displaying in the local camera display window 134 or storing. The local camera display window 134 displays the video or processed information to a display (not shown). The device control application 136 sends commands to the PTU 102, laser range meter 106, and video camera 104, for example to turn on or off the laser in the laser range meter 106. The device control application 136 receives position information from the PTU 102, distance and temperature from the laser range meter 106, and status information from the video camera 104. The remote session manager application 138 communicates with remote controllers 160 across a network 150. In embodiments, the network 150 is a LAN or local area network, a subnet of an Intranet, an Intranet, the Internet, or any other logical grouping of network connected devices, including but not limited to virtual private networks.

A remote operator on a remote computer 160 communicates with the LPS 100 across the network 150. In embodiments, the remote computer 160 comprises an LPS configuration manager 162 for setting up connections and managing communications with the local controller 130. The remote computer also comprises an LPS user interface display application 164 that provides an interactive window for the remote operator to operate the LPS 100. In addition to a keyboard and mouse, in embodiments the remote computer 160 further comprises a gamepad 168 or other controller for controlling the PTU 102, camera 104, and laser range meter 106 of the LPS 100. The remote computer 160 also comprises a video server display application 166 that displays images or video from the camera 104 received from either the local controller 130 or from a separate video server 140. In an embodiment, video or images from the camera 104 of the LPS 100 are sent to a video server 140. The video server 140 offloads the storage and streaming capability from the local controller 130 for images or video captured by the camera 104. The video server 140 streams images or video to the video server display application 166 on the remote computer 160. In an embodiment, the images or video of the video server display application 166 are displayed in a web browser application.

Referring now to FIG. 1b, a number of LPS 100 units are directed at one or more target objects 110 using, for example, laser range meters 106. Each LPS 100 is connected to a local controller 130, although in embodiments multiple LPS 100 units can be connected to a single local controller 130. A server, such as video server 140, streams video or images for each LPS 100 to one or more remote computers 160 across the network 150, although in embodiments, a single video server 140 can be utilized to handle video from multiple LPS units. Remote computers 160 connect to the local systems 130 across a network 150, although in embodiments one or more remote computers 160 can be local to the LPS 100 units and local controllers 130, for example if the network 150 is a Local Area Network, or LAN. Each local controller 130 can accept a network connection from multiple remote computers 160, enabling simultaneous or shared control of an LPS 100 by more than one remote computer 160. Each remote system 160 can establish a network connection with multiple local controllers 130, enabling simultaneous or shared control of multiple LPS 100 units by a single remote computer 160. The any-to-any system architecture that allows any remote computer 160 to communicate with any local controller 130 is facilitated by a framework of application components 200.

Referring now to FIG. 2, a framework of application components 200 of a Local Positioning System (LPS 100) communicate through inter-process communication channels 202 or links based on message passing. In an embodiment, the LPS 100 message passing process is based on network sockets. This approach allows the various application components 200, to run concurrently and work together to address different aspects of controlling an LPS 100. The application components 200 can be run in separate processes on the same computer 130, 160, for example, on separate processor cores of a multi-processor computer. The application components 200 can be distributed over multiple computers 130, 160 that are networked together. In embodiments, one or more of the application components 200 are running on computers in the network 150. In embodiments, inter-process communication channels 202 utilize protocols such as TCP/IP, UDP, HTTP, or any other protocol suitable for inter-process communications as would be understood in the art.

This framework of networked application components 200 creates a distributed operation process that facilitates control of one or more LPS 100 units, by one or more operators, and is especially adaptable for situations when the operators are not in close proximity to the LPS 100 hardware. The application components 200 facilitates remote operation of the LPS 100, permits simultaneous control by multiple operators, enables trade-off of control between operators, and permits resource sharing of LPS 100 units. Control can be performed by human operators or autonomous processes.

The LPS 100 user interface and device control are handled by separate application components 200 that work together using inter-process communication channels 202. This separation of user interface and device control application components 200 provides benefits over, for example, running all of the LPS 100 application components 200 on a single PC. For example, separate application components 200 allow the functionality to be distributed over multiple PCs, which can prevent a single PC from being a bottleneck if heavily loaded.

Another difference is that a distributed system doesn't share memory between processes. This allows the individual application components 200 to be stopped and restarted without having to restart the entire session. This enables the possibility for error recovery. If one of the application components 200 needs to be restarted, the other application components 200 still function and then reconnect when the restarted application components 200 comes back on-line.

Example application components 200 include a remote session manager 138 running on a local controller 130; a video server application 206 running on the local controller 130 or a separate platform such as a stand alone video server 140, a device control application 136 for controlling various hardware of the LPS 100, an LPS configuration manager 162 that run on a separate computing platform for example a remote computer 160 or a local handheld or heads-up display device, a video server display application 166 that provides images or video for the computing platform, an LPS user interface display application 164 that provides remote control of the LPS 100, and other processing or control applications 168 depending on the application and desired functionality. Inter-process communication channels 202 connect the application components, which may be processes on a common computing platform, or processes on separate computing platforms connected by wired or wireless network connections.

At the lower level, control commands for the LPS 100 are received on the local controller 130 by a device control application 136 using network sockets. Network sockets can support multiple connections, and therefore facilitate creating processes that can support multiple simultaneous operators where two or more operators can work with an LPS 100 measurement system simultaneously, in addition to the basic remote operation capability by a single operator.

Referring now to FIGS. 1a, 1b, and 2, in one example, a remote operator can direct the movement of the LPS 100 towards different positions on the target object 110 using the PTU 102, then take measurements with the laser range meter 106 and digital photographs/video using the camera 104, and also use the camera 104 or laser pointer of the laser range meter 106 to indicate positions of interest on the target object 110 while other operators participate in the same session. Those other participants (either local or remote) may also want to take control of the LPS 100 to show something to the remote operator or other participants. This process could be used as part of a remote training capability, allowing an expert operator to teach the use of the LPS 100 to a novice operator, who may be located with the LPS 100 hardware, or located at another remote site.

Another potential use of this capability pertains to situations involving sharing an LPS 100. For example, in a factory setting, one or more LPS 100 units could be set up in a networked environment and put into a general use server mode in which the LPS 100 units listen for and respond to remote requests. A remote access capability provides multiple operators use of the LPS 100 unit without having to recalibrate their own local reference systems.

In yet another possible configuration, the remote operation capability enables simultaneous control of multiple LPS 100 units by a single operator. This is useful in situations where a measurement task covers too large an area for a single LPS unit. The LPS 100 can be run either locally, with all of the application components 200 running on the PC or local controller 130 connected to the LPS 100 or it can be run remotely, with some of the application components 200 running on another PC. In this context, the word "local" will refer to the application components 200 that are at the measurement site.

The typical remote usage scenario will involve the control of the PTU 102, camera 104 and laser range meter 106 application components 200 that are running on the "local" PC, or local controller 130, that is connected to the LPS 100, while the LPS 100 user interface application is run on another PC (the "remote" PC, or remote computer 160) with a network connection to the local PC, or local controller 130.

To receive video from the local camera 104 at the remote computer 160, a separate video link, or communication channel 202, is established. In an embodiment, a video server application 206 running on a dedicated video server 140 is connected to the camera 104 running at the local site. The video server application 206 streams video over the network 150, for example using HTTP, or hypertext transfer protocol, via a communication channel 202 or link. A video decoder running in a video server display application 166 displays the video at the remote site, for example in a web browser. Video at the LPS 100 location (the "local" site) may be provided by the local camera display application 204 using a video stream from a video capture device such as the camera 104. In an embodiment, the local camera display application 204 comprises a video conversion application 132 such as a video decoder and a local camera display application 134 such as a web browser, and runs on the local controller 130, or another local PC. The local camera display application 204 may receive video from the video server application 206 via a communication channel 202 or by a separate connection to the camera 104, and then displays the video locally in the web browser.

Figure 3:
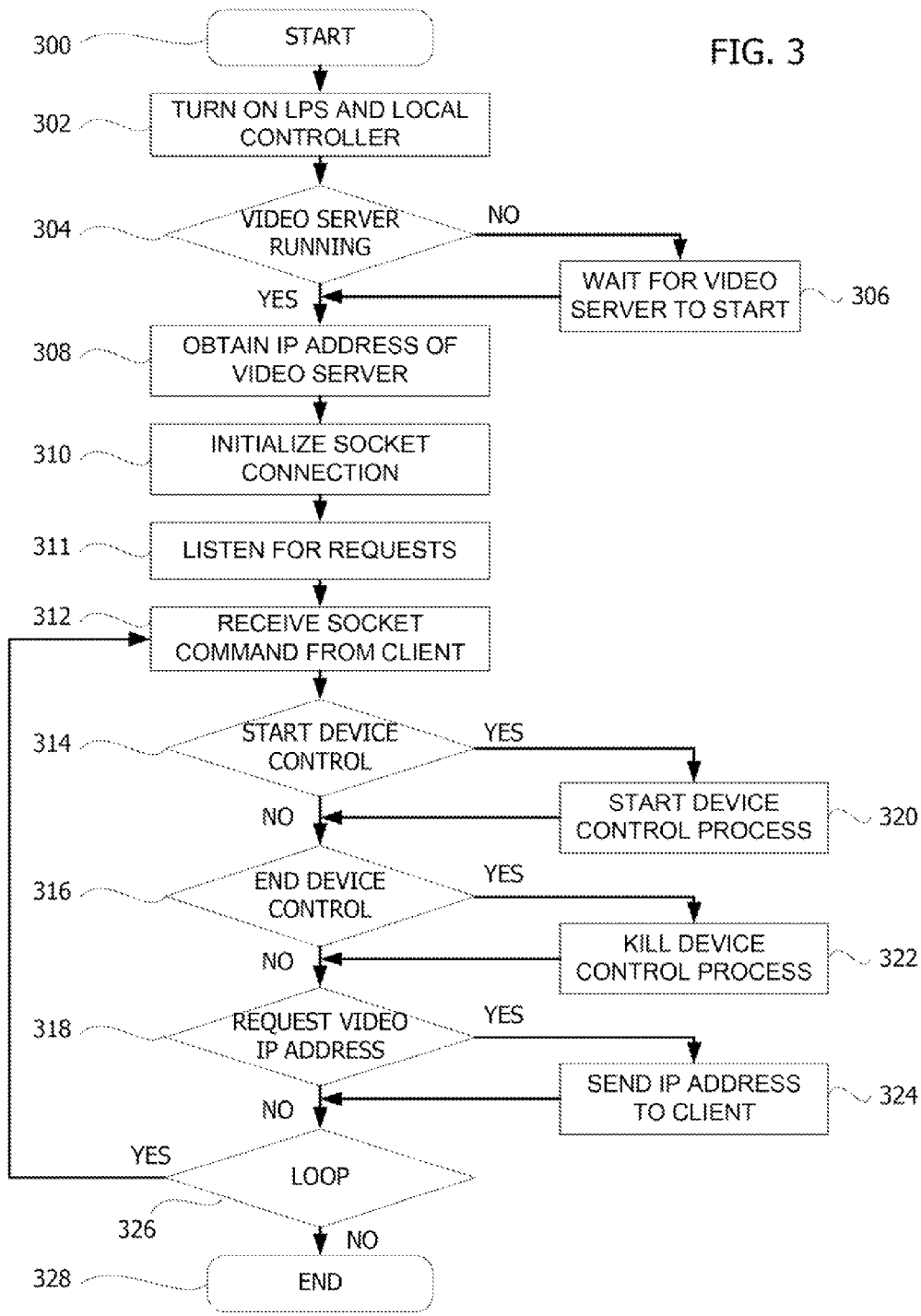
FIG. 3 is a flowchart of the operation of a local controller in one embodiment of a distributed Local Positioning System.

Referring now to FIG. 3, a flowchart of the local controller operation 300 is presented. The hardware for the LPS 100 and local controller 130 are setup 302, for example by making the appropriate network and other connections to the local controller 130 and turning the local controller 130 and LPS 100 on. The local controller 130 checks 304 to see if a video server application 206 is running. If the video server application 206 is not running, the local controller 130 signals the user and waits for the video server application 206 to start 306. Once the video server application 206 is running, the local controller 130 obtains 308 the IP address of the video server 140 that is running the video server application 206 and possibly other information, for example a port associated with the LPS 100. The IP address of the video server 140 that is running the video server application 206 can be preconfigured or static, or determined dynamically by the network 150, for example using DHCP, or dynamic host control protocol. In embodiments, the IP address of the video server 140 is configured in the local controller 130; the video server 140 forwards its IP address to the local controller 130; the IP address of the video server 140 is stored in a DNS or domain name server connected to the network 150; or the IP address is determined using ping, ARP or address resolution protocol, and the MAC or Media Access Control address of the video server 140. In the embodiment where the IP address is determined using ping, ARP and the MAC address, a local router or switch 152 provides a local LAN for the video server 140 and the local controller 130. The exact implementation depends upon the available features of the video server 140, which may be a commercially available video server 140 or a video server application 206 process running on the local controller 130 or another PC.

Once the local controller 130 is started 302 and the local controller 130 obtains 308 the IP address of the video server 140 or video server application 206, a listener program, the remote session manager application 138, is started on the local controller 130. The remote session manager application 138 initializes a socket connection and listens for requests 310 from a remote computer 160, for example a startup signal from the remote computer 160. Once the remote session manager application 138 is started, no other operations by the operator at the local site are necessary, and the remote session manager application 138 loops 326 until ended 328.

The function of the remote session manager application 138 listener program is to listen on the socket connection for remote commands 314, 316, 318 and respond to the commands or start and stop processes as requested. For example, if a client or remote computer 160 requests 318 the IP address of the video server 140, the remote session manager application 138 sends 324 the IP address of the video server 140 to the remote computer 160. In another example, the remote session manager application 138 starts a device control application 136. In embodiments the device control application 136 includes a camera control application, a PTU control application, and/or a laser control application, collectively referred to as device control application 136. The device control application 136 then enters its own listening mode waiting for the client, or remote computer 160, LPS configuration manager 162 to connect through a network socket. Remote commands for starting 314 or ending 316 a device control application 136 cause the remote session manager application 138 listener program to start 320 a device control process or kill 322 the device control process. For example, if the remote command for starting 314 is received, then the remote session manager application 138 listener program responds by starting a device control application 136 that controls the PTU 102, controls the camera 104, or controls the laser range meter 106 as commanded. The remote session manager application 138 listener program responds to remote command for ending 316 by killing the device control application 136. Similar processes can be started and ended for the optional local camera display application 204.

Referring now to FIG. 4, a flowchart of the remote controller operation 400 is presented. At a remote location the LPS configuration manager 162 runs on the remote computer 160. In situations where control is shared with a local user, the LPS configuration manager 162 can be run on a local PC, computing platform, handheld device, or the local controller 130. Generally, one LPS configuration manager 162 is run for each instance of the operator interface. The operator specifies 402 which remote LPS 100 to connect to and the LPS configuration manager 162 establishes a connection 404 with the RSM or remote session manager application 138 on the local controller 130. The LPS configuration manager 162 queries the status of the LPS 100 to determine if there is a device control application 136 running 406, and if not the LPS configuration manager 162 signals the remote session manager application 138 in the local controller 130 to start a device control application 136, for example by sending a PTU start command to the remote session manager application 138 on the local controller 130.

The LPS configuration manager 162 determines 410 if the IP address of the video server 140 is known, and if not the LPS configuration manager 162 requests 412 the IP address of the video server 140 from the remote session manager application 138, which obtains 308 IP address and returns 414 the IP address to the LPS configuration manager 162. The LPS configuration manager 162 configures 416 the LPS user interface display application 164 with the appropriate settings for remote, multi-user, and/or multi-device operation. For example, if no LPS user interface display application 164 is running 418, then the LPS configuration manager 162 starts 420 the LPS configuration manager 162 for remote operation of the LPS. If an LPS user interface display application 164 is running 418, then the operator is connected 422 to the running LPS user interface display application 164. When the LPS user interface display application 164 is started, a startup signal is sent to the remote session manager application 138 listening at the local site to start 306 the video server application 206. The LPS configuration manager 162 starts 424 the video server display application 166 which allows the remote operator to see images or streaming video from the camera 104 of the LPS 100. The video server display application 166 shows the images or streaming video in a display application, such as a web browser, that is linked to the video server 140 or video server application 206 running at the local site.

The remote operator uses gamepad 168, keyboard, or other user interface at the remote computer 160 to operate the LPS 100. In embodiments, one or more remote operators may operate the LPS at the same time, where each usage instance establishes its own connection to the session. When the remote operator leaves the session, the LPS configuration manager 162 determines 428 if multiple simultaneous connections are established, and if so disconnects 430 only that remote operator from the session. Otherwise the LPS configuration manager 162 ends 432 the session.

In some configurations, remotely mapped file systems are used to save and share data files. If these configurations, the network drive is generally mapped before the LPS configuration manager 162 is started.

Regardless of whether the operator or operators are co-located with the LPS or remotely connected to the LPS 100, the distributed nature of the framework of application components 200 allows all users to have the same levels of system access and control of the LPS 100. Remote operators are not limited to situations where long distances separate the remote operator from the LPS 100 hardware. For example the LPS 100 could be located in one part of a factory, while the operator is located in another (safer or more convenient) part of the factory. In an embodiment of this "remote user at a local site" configuration, the remote operator runs the system through a device like a smartphone with remote connections similar to a PC. Here, the smartphone may be used as the video display, as well as a control interface, with both touch screen control elements and accelerometer/gyro-based motion controls. This method also works with an "LPS-lite" concept, wherein the LPS 100 doesn't have a camera and wherein the local operator instead uses the LPS laser spot as a visual guide. Another variation of this is a computing device with an augmented reality (AR) display, for example a smartphone having a head-mounted AR unit for receiving visual information. In embodiments, the head tracking abilities of the AR unit controls the LPS positioning in combination with the smartphone control inputs or other peripherals.

The embodiments of the invention shown in the drawings and described above are exemplary of numerous embodiments that may be made within the scope of the appended claims. It is contemplated that numerous other configurations of the system and method for distributed operation of a Local Positioning System may be created taking advantage of the disclosed approach. It is the applicant's intention that the scope of the patent issuing herefrom will be limited only by the scope of the appended claims.

What is claimed is:

1. A method for controlling a local positioning system, comprising:
   establishing a network connection with a remote session manager associated with the local positioning system;
   sending a device control command to said remote session manager, said device control command controlling the local positioning system;
   providing a user interface for sending a plurality of device control commands to the local positioning system.

2. The method of claim 1, further comprising:
   sending a network address request to said remote session manager for receiving a plurality of images from an image device associated with the local positioning system; and
   receiving a network address from said remote session manager, said network address associated with a server for providing said images;
   establishing a second network connection to said server using said network address;
   receiving said images; and,
   displaying said images.

3. The method of claim 2, wherein said server is a video server, and wherein said images are streaming video.

4. The method of claim 1, further comprising:
   disconnecting said network connection with said remote session manager to end the operation of controlling the local positioning system.

5. The method of claim 1, wherein said network connection uses a network socket for inter-process communication with said with a remote session manager, and wherein said remote session manager is adapted to accept a plurality of network connections and device control commands from a plurality of user interfaces.

6. The method of claim 5, wherein a configuration manager application establishes said network connection, wherein a user interface application provides said user interface, and wherein said configuration manager and said user interface are distributed processes that communicate using said network socket for inter-process communication.

7. The method of claim 6, wherein said configuration manager application establishes a plurality of network connections with a plurality of local positioning systems and said user interface controls said plurality of local positioning systems.

8. A method of providing control of a local positioning system to an operator, comprising:
   initializing a network interface of a remote session manager associated with the local positioning system;
   listening to said network interface for a network connection request from the operator;
   establishing a network connection between the operator and said remote session manager upon receiving said network connection request;
   receiving a device control command across said network connection from the operator, said device control command associated with controlling the local positioning system; and
   sending said device control command to a device control application having an interface to the local positioning system.

9. The method of claim 8, wherein said remote session manager starts said device control application, and wherein said device control application controls a hardware function of the local positioning system across said interface to the local positioning system.

10. The method of claim 8, further comprising:
    obtaining a network address of a server associated with the local positioning device, said server providing a plurality of images from the local positioning device;
    receiving a request from said operator for a network address of said server; and
    sending said network address to said operator.

11. The method of claim 10, further comprising:
accepting a second network connection from said operator by said server at said network address;
providing said plurality of images from said server to said operator across said second network connection.

12. The method of claim 11, wherein said plurality of images is a video stream, and wherein said operation of providing said plurality of images comprises streaming said video stream to said operator.

13. The method of claim 8, wherein said network connection uses a network socket for inter-process communication with said remote session manager.

14. The method of claim 13, wherein said remote session manager and said device control application are distributed processes that communicate using said network socket.

15. The method of claim 8, wherein the operator is a remote operator and said network connection is transmitted across a network, and wherein said network is selected from the group consisting of a local LAN, a subnet, an Intranet, and the Internet, and wherein said network supports a protocol selected from the group consisting of TCP/IP, UDP, and HTTP.

16. A system for controlling a local positioning system, comprising:
a local system, further comprising:
    a local positioning system interface connected to the local positioning system;
    a first network interface connected to a network;
    a device control application for controlling the local positioning system through said local positioning system interface; and
    a remote session manager that accepts a network connection request on said first network interface, said remote session manager directs a device control message to said device control application, and said remote session manager responds to a remote command; and,
a remote system, further comprising:
    a second network interface for connecting to a network;
    a configuration manager that establishes a network connection with said remote session manager associated with the local positioning system, said configuration manager sends said network connection request from said second network interface across said network to said first network interface; and
    a user interface that sends a plurality of device control commands to said local system.

17. The system of claim 16, further comprising:
a video server in communication with said local positioning system for streaming video of the local positioning system, said video server having a network address; and,
wherein said remote session manager obtains said network address of said video server, and said configuration manager sends a remote command to request said network address from said remote session manager, and said remote session manager sends said network address to said configuration manager; and,
wherein said remote system further comprises:
    a remote video display that establishes a second network connection to said network address of said video server and displays said streaming video across said second network connection.

18. The system of claim 16, wherein said network connection uses a network socket, and wherein said network supports a protocol selected from the group consisting of the TCP/IP protocol, the UDP protocol, and the HTTP protocol, and wherein said network is selected from the group consisting of a local LAN, a subnet, an Intranet, and the Internet.

19. The system of claim 16, wherein said device control application comprises one or more processes selected from the group consisting of a pan-tilt unit (PTU) process that operates a pan-tilt unit (PTU) of the local positioning system, a laser control process that turns on and off the laser range finder and obtains temperature and range information from the laser range finder, a camera process that receives a plurality of images from a camera of the local positioning system, and a camera process that receives video from a camera of the local positioning system.

20. The system of claim 16, wherein said remote session manager of said local system is adapted to accept a plurality of connection requests from a plurality of configuration managers for simultaneous control of the local positioning system by a plurality of remote systems, and wherein said configuration manager of said remote system is adapted to establish a plurality of network connections with a plurality of remote session managers of a plurality of local systems for simultaneous control of a plurality of local positioning systems by said remote system.

* * * * *